United States Patent
Gu et al.

(10) Patent No.: US 12,536,420 B2
(45) Date of Patent: Jan. 27, 2026

(54) LOW POWER GENERATIVE ADVERSARIAL NETWORK ACCELERATOR AND MIXED-SIGNAL TIME-DOMAIN MAC ARRAY

(71) Applicant: NORTHWESTERN UNIVERSITY, Evanston, IL (US)

(72) Inventors: Jie Gu, Evanston, IL (US); Zhengyu Chen, Evanston, IL (US)

(73) Assignee: NORTHWESTERN UNIVERSITY, Evanston, IL (US)

( * ) Notice: Subject to any disclaimer, the term of this patent is extended or adjusted under 35 U.S.C. 154(b) by 1263 days.

(21) Appl. No.: 17/347,017

(22) Filed: Jun. 14, 2021

(65) Prior Publication Data

US 2021/0390380 A1    Dec. 16, 2021

Related U.S. Application Data

(60) Provisional application No. 63/039,100, filed on Jun. 15, 2020.

(51) Int. Cl.
*G06N 3/063* (2023.01)
*G06N 3/045* (2023.01)
*G06N 3/088* (2023.01)

(52) U.S. Cl.
CPC ............. *G06N 3/063* (2013.01); *G06N 3/045* (2023.01); *G06N 3/088* (2013.01)

(58) Field of Classification Search
None
See application file for complete search history.

(56) References Cited

U.S. PATENT DOCUMENTS

| | | | | |
|---|---|---|---|---|
| 9,820,074 | B2 * | 11/2017 | Atkins | ............. G06F 3/064 |
| 10,387,122 | B1 * | 8/2019 | Olsen | ............. G06N 3/063 |
| 2019/0138267 | A1 * | 5/2019 | Mailey | ........... G06F 3/04817 |
| 2020/0311535 | A1 * | 10/2020 | Shrivastava | .......... G06V 10/82 |
| 2021/0142467 | A1 * | 5/2021 | Burkhardt | .......... B23K 31/02 |

OTHER PUBLICATIONS

Du, "Time Domain Multiply and Accumulate Engine for Convolutional Neural Networks", Thesis, The Ohio State University 2020. (Year: 2020).*

Ekroot et al., "A GaAs 4-bit Adder-Accumulator Circuit for Direct Digital Synthesis", (1988) (Year: 1988).*

Kashinath et al., "High-Speed and Energy-Efficient MAC design using Vedic Multiplier and Carry Skip Adder", (Oct. 2017) (Year: 2017).*

(Continued)

*Primary Examiner* — Andrew J Jung
*Assistant Examiner* — Beatriz Ramirez Bravo
(74) *Attorney, Agent, or Firm* — Benesch Friedlander Coplan & Aronoff LLP

(57) ABSTRACT

Systems and methods for a low-cost mixed-signal time-domain accelerator for generative adversarial network (GAN) are provided. In one aspect, a system includes a memory and a training management unit (TMU) in communication with the memory. The TMU is configured to manage a training sequence. The system includes a time-domain multiplication-accumulation (TDMAC) unit in communication with the TMU, wherein the TDMAC unit is configured to perform time-domain multiplier operations and time-domain accumulator operations.

9 Claims, 23 Drawing Sheets

(56) References Cited

OTHER PUBLICATIONS

Reynders et al., "Variation-Resilient Sub-Threshold Circuit Solutions for Ultra-Low-Power Digital Signal Processors with 10MHz Clock Frequency", (2012) (Year: 2012).*
Yin et al., "A 2.6 TOPS/W 16-bit Fixed-Point Convolutional Neural Network Learning Processor in 65-nm CMOS", (Nov. 20, 2019) (Year: 2019).*
Masadeh et al., "Input-Conscious Approximate Multiply-Accumulate (MAC) Unit for Energy-Efficiency", (Oct. 2019) (Year: 2019).*
Roohi et al., "ApGAN: Approximate GAN for Robust Low Energy Learning From Imprecise Components", (Mar. 2020) (Year: 2020).*
Amravati et al., "A 55 nm Time-Domain Mixed-Signal Neuromorphic Accelerator with Stochastic Synapses and Embedded Reinforcement Learning for Autonomous Micro-Robots", (2018) (Year: 2018).*
Mao et al., "AdaLearner: An Adaptive Distributed Mobile Learning System for Neural Networks", (2017) (Year: 2017).*
Radford, Alec et al., "Unsupervised Representation Learning With Deep Convolutional Generative Adversarial Networks," arXiv preprint arXiv:1511.06434v2, Jan. 2016, 16 Pages.
Liu, Muqing et al., "A Scalable Time—based Integrate-and-Fire Neuromorphic Core with Brain—Inspired Leak and Local Lateral Inhibition Capabilities," IEEE International Custom Integrated Circuits Conference (CICC), 2017, 4 Pages.
Cao, Ningyuan et al., "A 65nm 1.1-to-9.1TOPS/W Hybrid-Digital-Mixed-Signal Computing Platform for Accelerating Model-Based and Model-Free Swarm Robotics," IEEE International Solid-State Circuits Conference, Feb. 2019, 3 Pages.
Sayal, Aseem et al., "All-Digital Time-Domain CNN Engine Using Bidirectional Memory Delay Lines for Energy-Efficient Edge Computing," IEEE International Solid-State Circuits Conference, Feb. 2019, 3 Pages.
Lee, Edward H. et al., "A 2.5GHz 7.7TOPS/W Switched-Capacitor Matrix Multiplier with Co-designed Local Memory in 40nm," IEEE International Solid-State Circuits Conference, Feb. 2016, 3 Pages.
Chen, Zhengyu et al., "A Scalable Pipelined Time-Domain DTW Engine for Time-Series Classification Using Multibit Time Flip-Flops with 140Giga-Cell-Updates/s Throughput," IEEE International Solid-State Circuits Conference, Feb. 2019, 3 Pages.
Yoshioka, Kentaro et al., "PhaseMAC: A 14 TOPS/W 8bit GRO based Phase Domain MAC Circuit for In-Sensor-Computed Deep Learning Accelerators," VLSI, 2018, 2 Pages.
Fashion database retrieved on Oct. 11, 2021, <www.kaggle.comzalando-researchfashionmnist>.
EMOJI database retrieved on Oct. 11, 2021 from <getemoji.com>.

* cited by examiner

Hardware Adaption

Batch Norm Simplification $$\mu_\beta \leftarrow \frac{1}{m} \sum_{i=1}^{x} x_i$$

$$\sigma_\beta^2 \leftarrow \frac{1}{m} \sum_{i=1}^{x} (x_i - \mu_\beta)^2$$

$$\hat{x}_i \leftarrow \frac{x_i - \mu_\beta}{\sqrt{\sigma_\beta^2 + \epsilon}}$$

☒ $y_i \leftarrow \gamma \hat{x}_i + \beta = BN_{\gamma\beta}(x_i)$

▨ // Mini-Batch Mean
▧ // Mini-Batch Variance
▨ // Normalize
▦ // Dynamic Scale

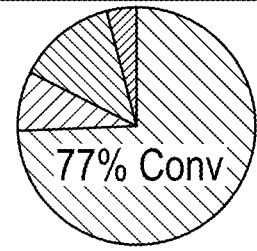
77% Conv

Optimizer Simplification

Adam

$$v_t = \beta_1 \cdot v_{t-1} - (1-\beta_1) \cdot g_t$$

$$s_t = \beta_2 \cdot s_{t-1} - (1-\beta_2) \cdot g_t^2$$

$$\Delta \omega_t = -\eta \frac{v_t}{\sqrt{s_t + \epsilon}} \cdot g_t$$

$$\omega_{t-1} = \omega_t + \Delta \omega_t$$

⟶

SGD with Momentum

$$v_t \leftarrow \eta \cdot v_t - \alpha \cdot \nabla_\omega \sum_{1}^{m} L_m(\omega)$$

$$\omega_t \leftarrow v_t + \omega_t$$

- Remove Complex Operations
- 11x Saving from SGD

FIG. 1D

| | [5] ISSCC 2016 | [7] VLSI 2018 | [2] ICC 2017 | [3] ISSCC 2019 | [4] ISSCC 2019 | This work |
|---|---|---|---|---|---|---|
| Architecture | Switch Capacitor | TD ASIC | TD ASIC | TD ASIC | TD ASIC | TD ASIC |
| Application | Gradient Descent | DNN Inference | Image Recog | Reinforcement Learning | CNN Inference | GAN |
| Process(nm) | 40 | 28 | 65 | 65 | 40 | 65 |
| Area (mm$^2$) | 1.44 | 0.02 | 0.24 | 2.0 | 0.12 | 3.94 |
| Input/Weight Resolution (bit) | 6/3 | 8/8 | 1/3 | 8/8 | 8/1 | 8/8 |
| Learning | Offline | Offline | Offline | Online | Offline | Online |
| Freq.(MHz) | 2500 | 780 | 99 | 1.5 | 25 | 90 |
| Power (mW) | 0.65 | 0.15 | 0.75 | 0.003 | 0.03 | 8(MAC) 31(ASIC) |
| Throughput (GOPS) | 1 | 0.8 | 0.004 | 0.0033 | 0.365 | 18* |
| MAC Efficiency (Tops/w*Bit) | 16 | 112 | 77 | 1.1 | 12 | 18* |
| On-die SRAM | - | - | 0.1 KB | 16 KB | NO | 52KB |

*Accumulation and Multiplication are Counted as 2 Operations

FIG. 6D

LOW POWER GENERATIVE ADVERSARIAL NETWORK ACCELERATOR AND MIXED-SIGNAL TIME-DOMAIN MAC ARRAY

CROSS-REFERENCE TO RELATED APPLICATIONS

The present application claims the benefit of priority under 35 U.S.C. § 119 from U.S. Provisional Patent Application Ser. No. 63/039,100 entitled "A Low Power Generative Adversarial Network Accelerator and Mixed-signal Time-domain MAC Array," filed on Jun. 15, 2020, the disclosure of which is hereby incorporated by reference in its entirety for all purposes.

STATEMENT OF FEDERALLY FUNDED RESEARCH OR SPONSORSHIP

This invention was made with government support under grant number 1846424 awarded by the National Science Foundation. The government has certain rights in the invention.

TECHNICAL FIELD

The present disclosure generally relates to machine learning, and more specifically relates to low power generative adversarial network accelerators and mixed-signal time-domain MAC arrays.

BACKGROUND

In deep learning applications, a conventional generative adversarial network (GAN) is often implemented with a high end central processing unit (CPU) or a high end graphics processing unit (GPU). In such conventional implementations of the GAN, the high end CPU or GPU (e.g., in desktop environments) will typically use power in the order of Watts or hundreds of Watts.

SUMMARY

Systems and methods for a low-cost mixed-signal time-domain accelerator for generative adversarial network (GAN) are provided.

According to certain aspects of the present disclosure, a system is provided. The system includes a memory and a training management unit (TMU) in communication with the memory. The TMU is configured to manage a training sequence. The system includes a time-domain multiplication-accumulation (TDMAC) unit in communication with the TMU, wherein the TDMAC unit is configured to perform time-domain multiplier operations and time-domain accumulator operations.

According to certain other aspects of the present disclosure, an edge device is provided. The edge device includes a memory and a mixed-signal generative adversarial network (GAN) accelerator in communication with the memory. The GAN accelerator is configured to perform mixed-signal time-domain training.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF DRAWINGS

The disclosure is better understood with reference to the following drawings and description. The elements in the figures are not necessarily to scale, emphasis instead being placed upon illustrating the principles of the disclosure. Moreover, in the figures, like-referenced numerals may designate to corresponding parts throughout the different views.

FIGS. 1A-1D illustrate an example GAN algorithm and an example hardware implementation.

FIGS. 6A-6D illustrate an example die photo and comparison table.

DETAILED DESCRIPTION

Figure 1A:
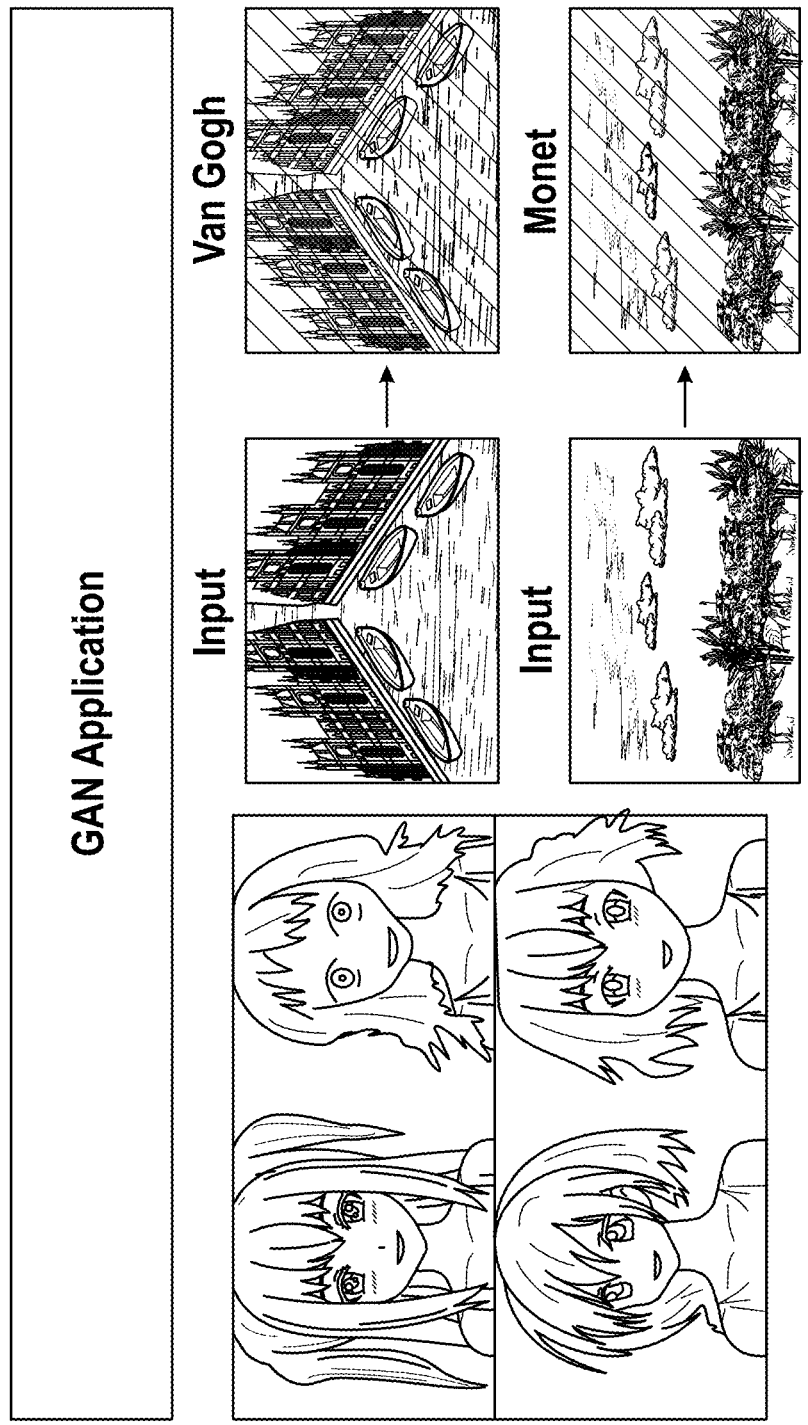
Figure 1B:
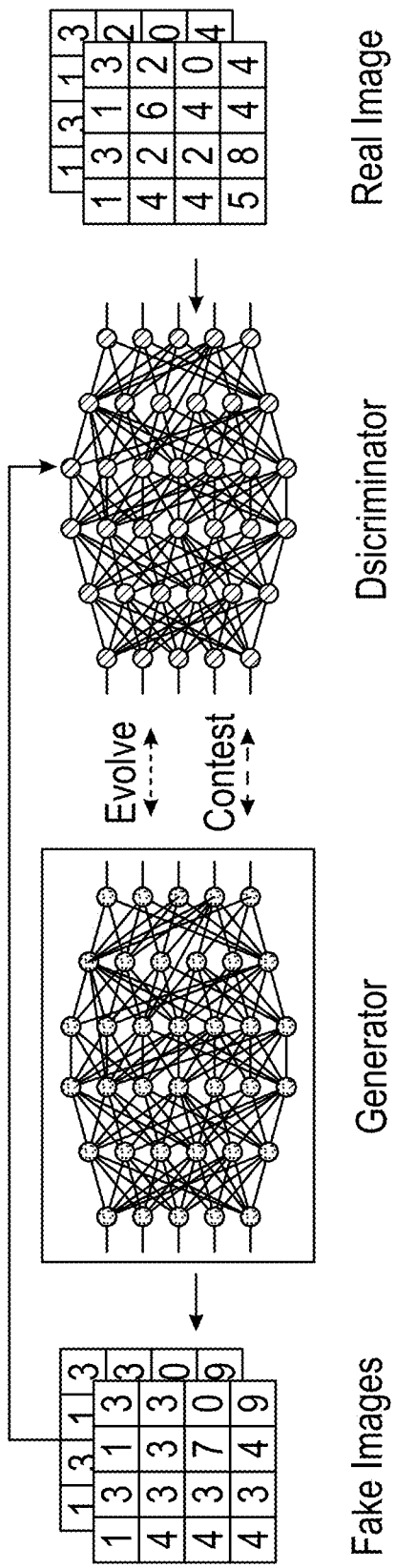
Figure 1C:
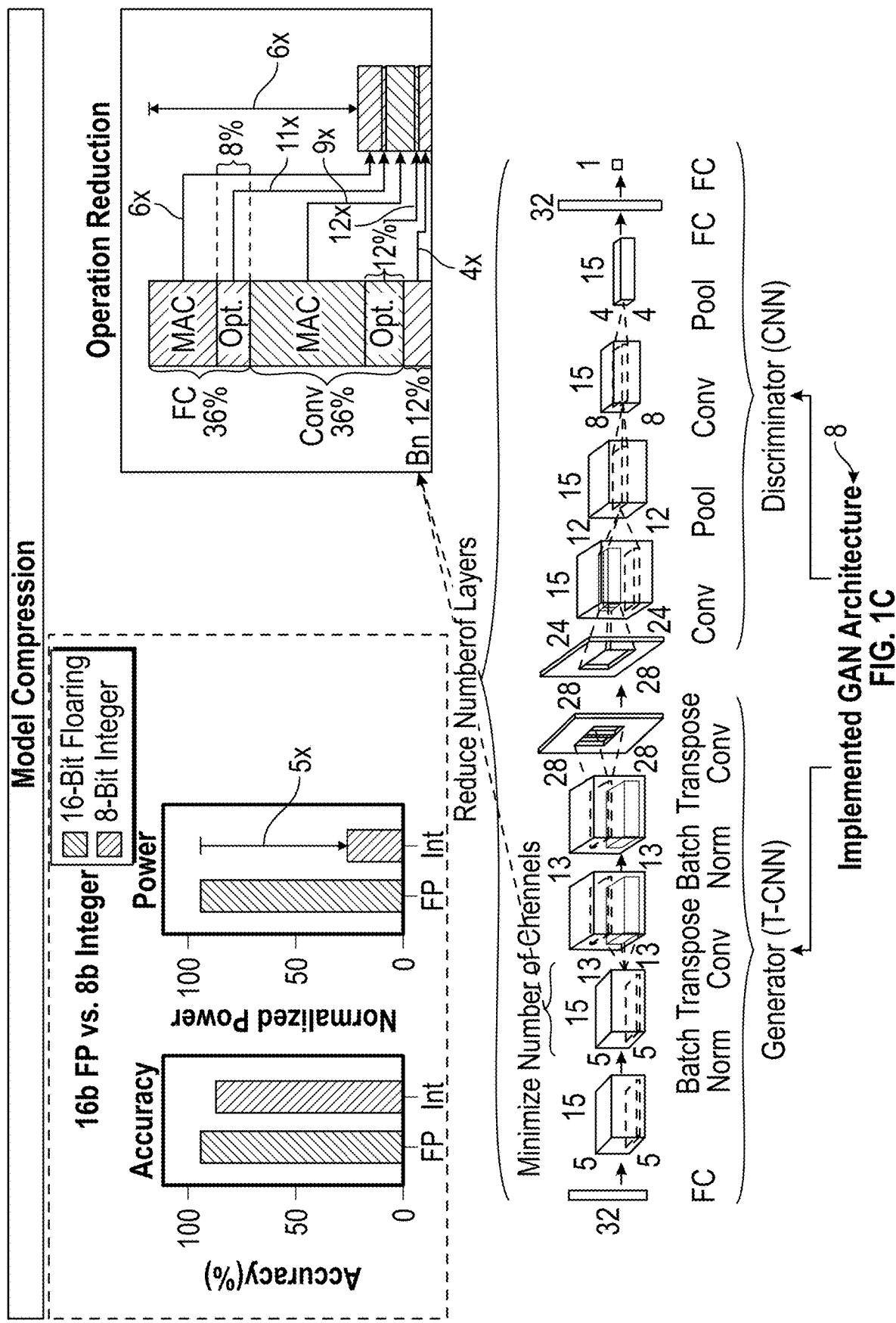

The detailed description set forth below is intended as a description of various implementations and is not intended to represent the only implementations in which the subject technology may be practiced. As those skilled in the art would realize, the described implementations may be modified in various different ways, all without departing from the scope of the present disclosure. Accordingly, the drawings and description are to be regarded as illustrative in nature and not restrictive.

Conventional GAN is rendered as one of the most interesting and challenging applications in deep learning space. Despite its broad real-time applications in gaming, authentication, and VR, for example, there is a lack of a dedicated low power GAN accelerator due to the tremendous challenges on resource-limited edge devices. From the algorithm aspect, conventional GAN is extremely difficult to train due to model collapses from unbalanced models and high sensitivity to hyper-parameters. From the hardware aspect, conventional GAN involves two deep neural networks (DNNs) with complex training sequences, e.g. 41 different training stages as in this work. Moreover, the typical floating-point training and complex calculation, e.g. batch normalization and optimizers, are very expensive for a resource-limited edge device.

The disclosed systems and methods, through significant architecture improvement and hardware adaptation, provide a mixed-signal GAN accelerator with 8-bit resolution for cost-effective implementation on edge device. Certain aspects of the disclosed technology include: (1) for the first time, a complete GAN training core implemented on an 8-bit low-power application-specific integrated circuit (ASIC) chip consuming only 39 mW; (2) an efficient subthreshold time-domain (TD) multiplier designed with significant area saving compared to digital design; (3) On-chip training performed in mixed-signal TD for the first time. In certain aspects, the disclosed systems and methods eliminated 94% overhead from domain conversion, leading to the state-of-art throughput for a mixed-signal based accelerator which normally suffers from slow operation speed.

In certain aspects, the disclosed systems and methods provide, at algorithm level, an adaptive training strategy and hardware simplification which makes the training process hardware friendly for low power edge devices. In certain aspects, the disclosed systems and methods provide, at hardware level, an ASIC training engine that supervise the training sequence. Such aspects, use very low power compared with previous conventional dependence on CPU to do the job. In certain aspects, the disclosed systems and methods provide, at circuit level, a time-domain multiplication-accumulation (MAC) circuit which uses time-domain multiplier and time-domain accumulator to save the cost and power compared with digital counterpart. In certain aspects, the disclosed systems and methods provide GAN that consumes 39 mW and finishes tasks much faster.

FIGS. 1A-1D show the implemented GAN architecture 8 with model compression and hardware adaptation techniques used in this work. For fitting with a small chip budget on edge device, we targeted a low-budget architecture implementation of deep convolutional GAN (DCGAN) using greyscale image with a size of 28×28 pixels. The following techniques were specially developed: (1) model balancing and adaptive training were utilized to enable 8-bit training versus conventional floating-point training, leading to a 5× reduction in hardware cost; (2) The challenging and memory consuming operations of batch normalization were simplified by disabling low-impact runtime operations, rendering a 77% removal of the associated operations; (3) The expensive ADAM optimizer was replaced by a succinct momentum stochastic gradient descent optimizer suitable for integer implementation with an 11× reduction of the optimizer's computation; (4) The number of layers and channels were further minimized to reduce the computation load by 6× to 9×. Overall, a 6× reduction of training complexity, a 6.5× hardware cost reduction, and an 11× reduction of on-chip memory were achieved through the algorithm simplification with about a 3% loss of accuracy.

Figure 2:
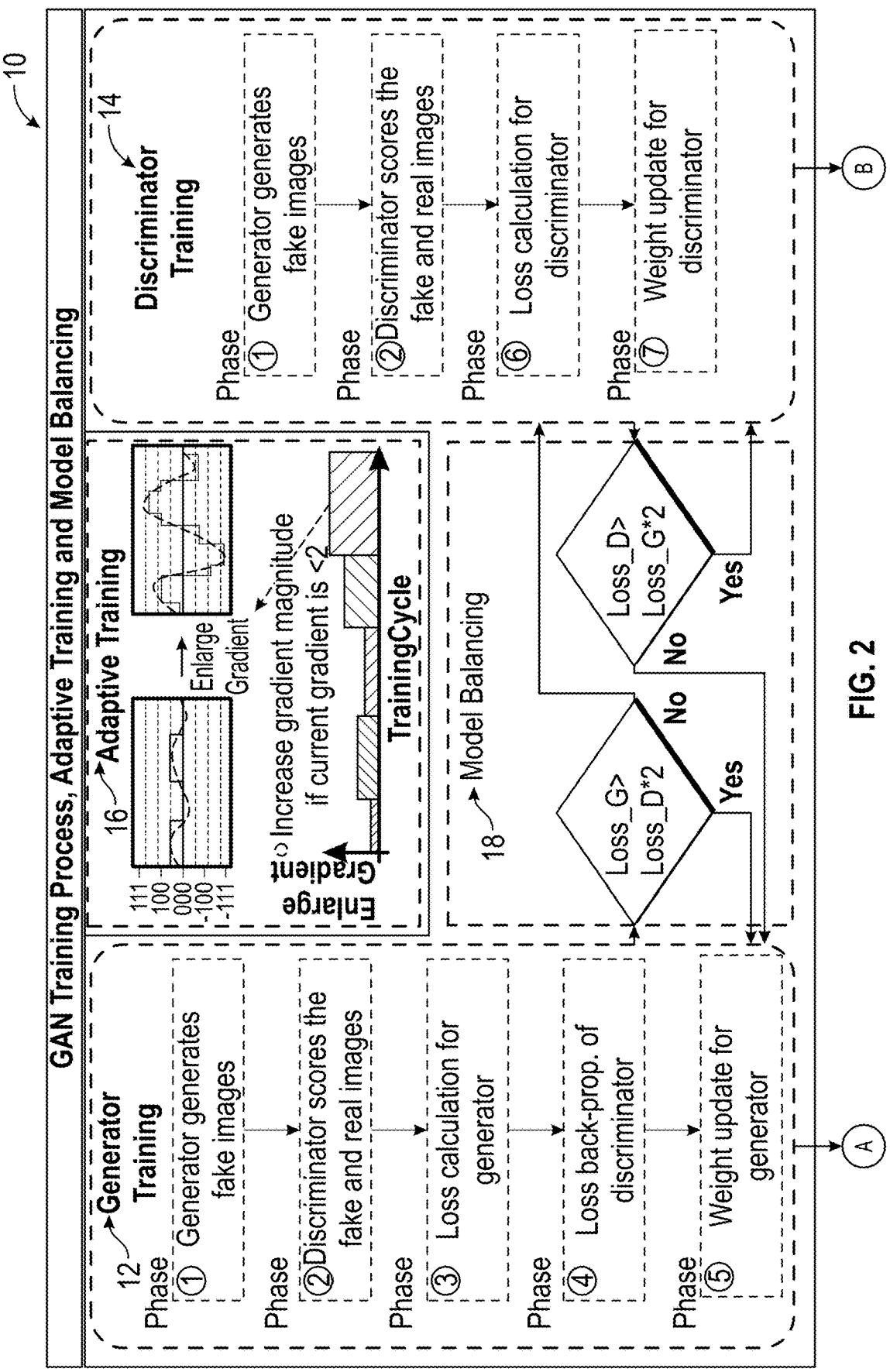
FIG. 2 illustrate an example GAN training sequence and an example ASIC TMU core design.
Figure 2:
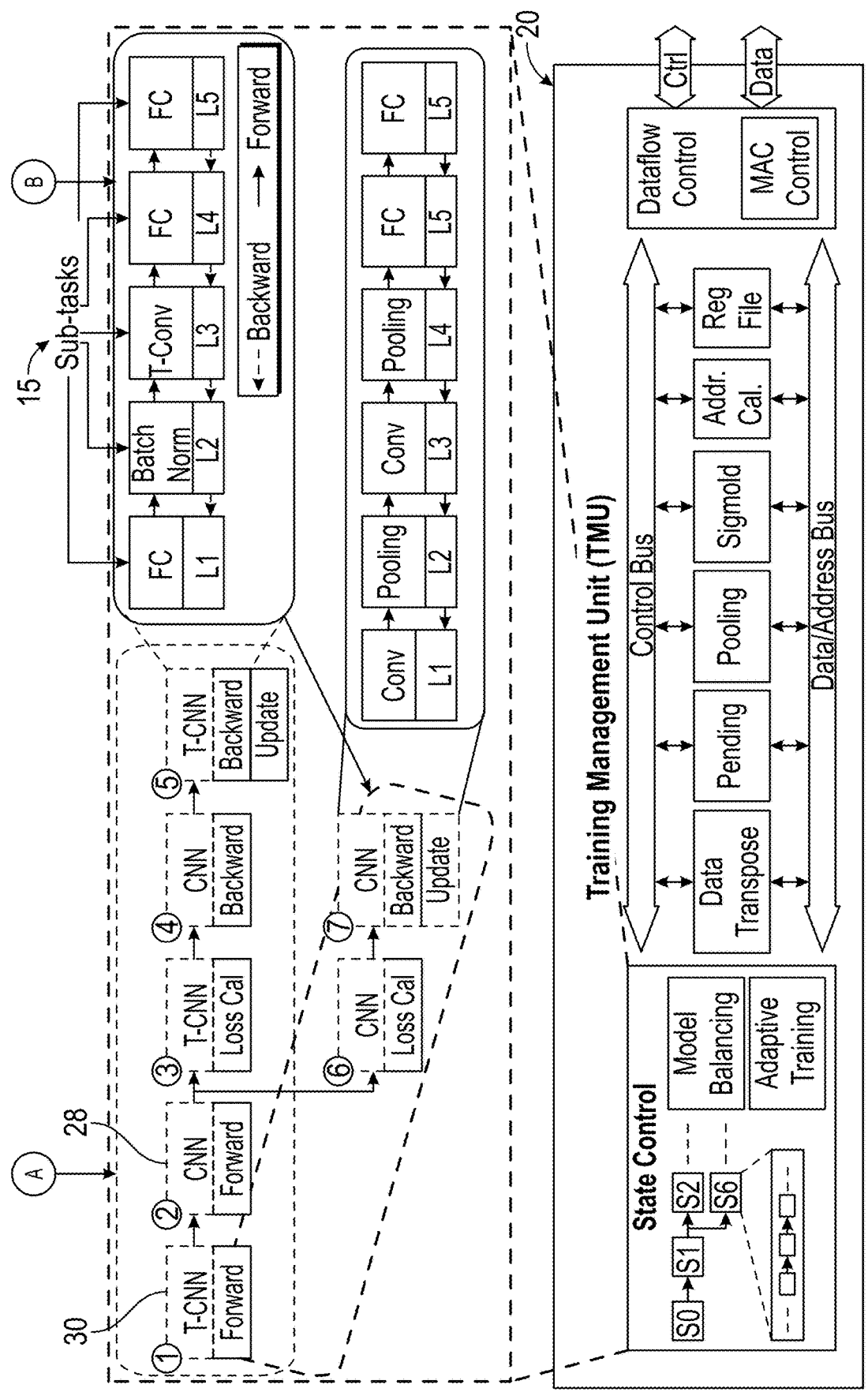
Figure 3A:
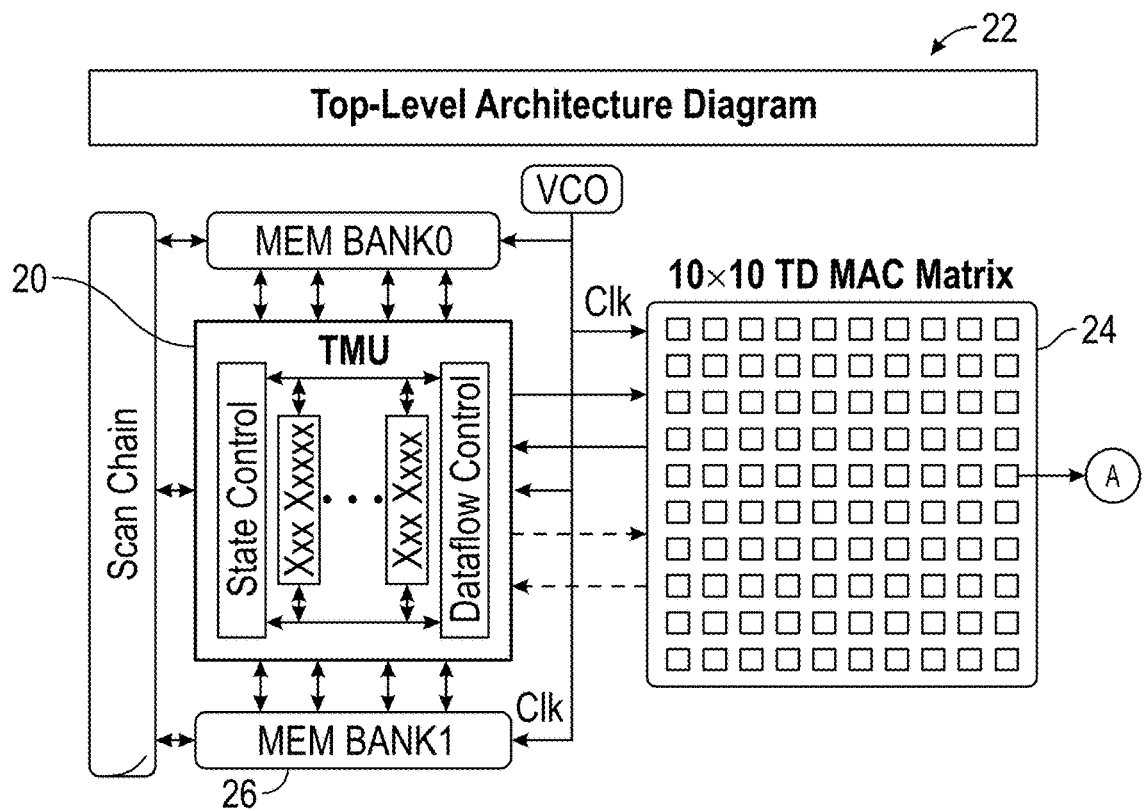
FIGS. 3A-3F illustrate an example top-level architecture diagram with an example MAC array and an example TD-Accumulator, an example TD ReLU circuit, and an example TD MAC unit.
Figure 3B:
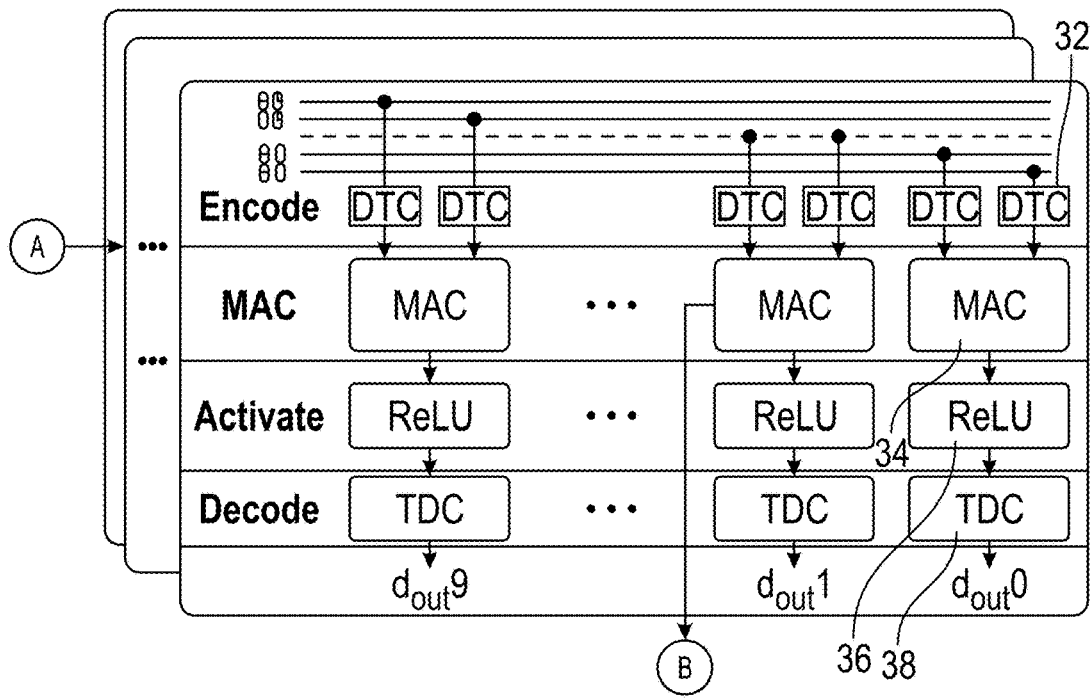
Figure 3C:
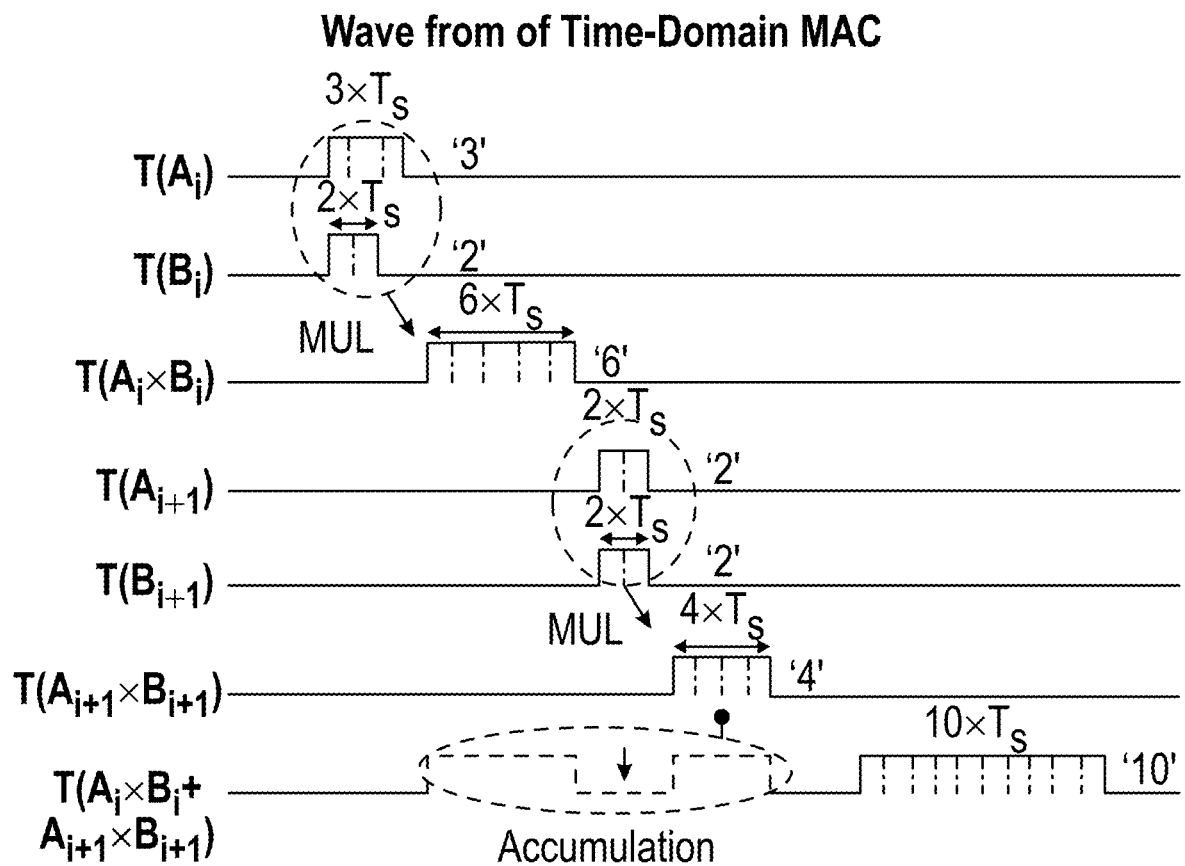
Figure 3D:
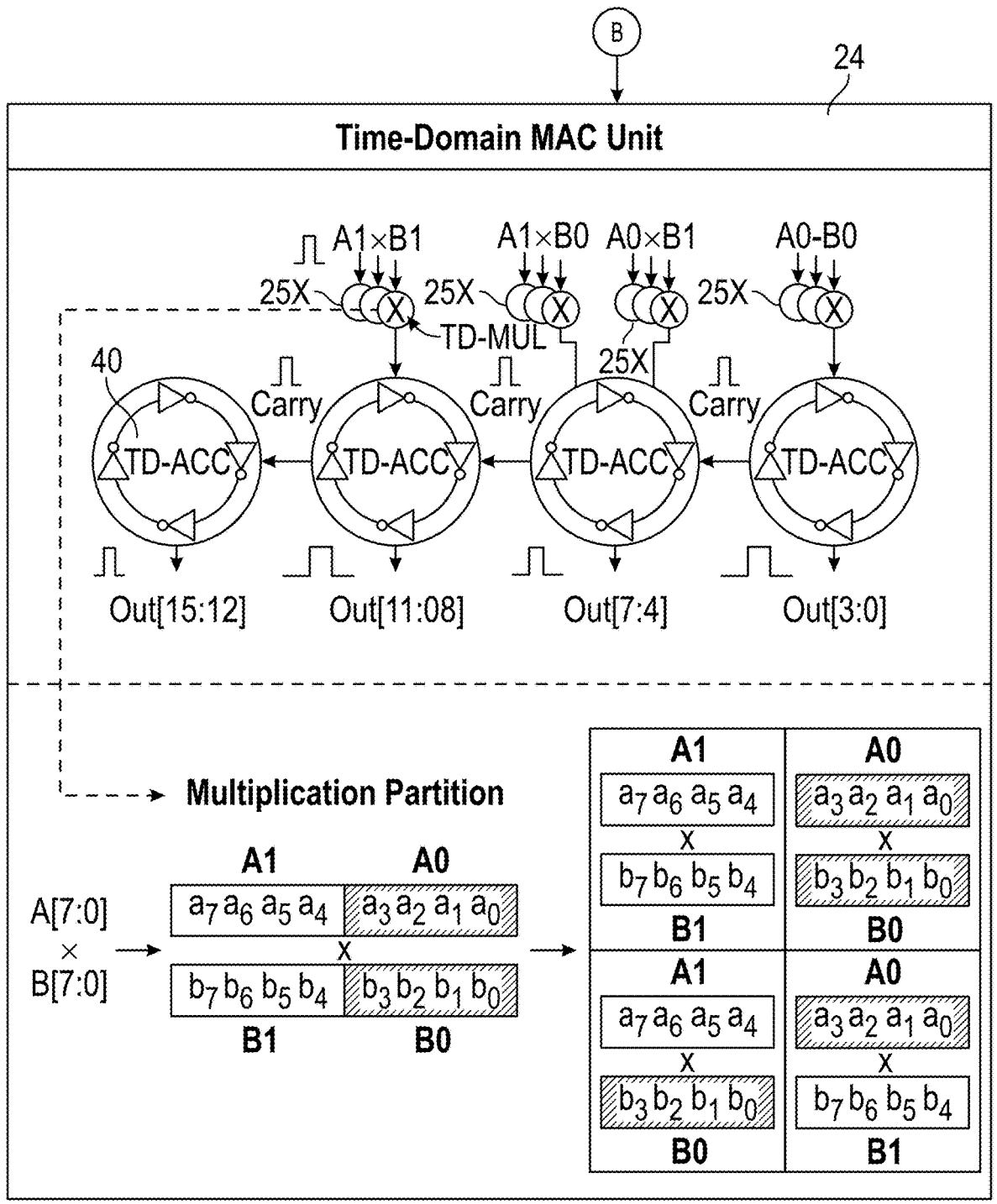
Figure 3E:
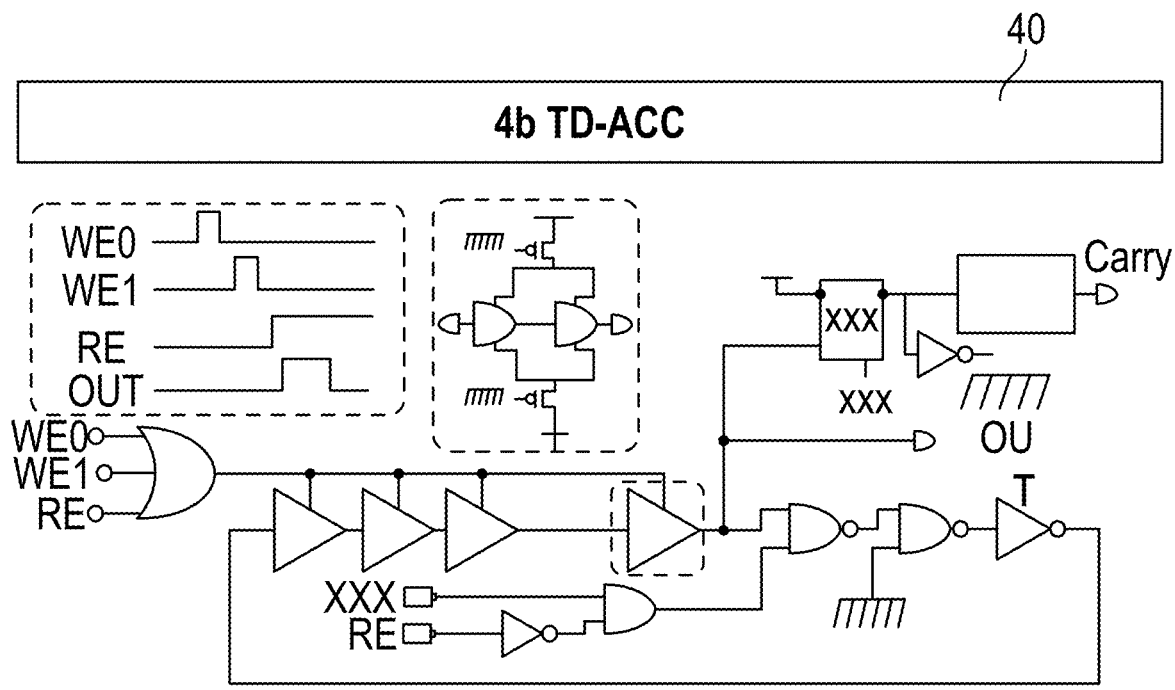
Figure 3F:
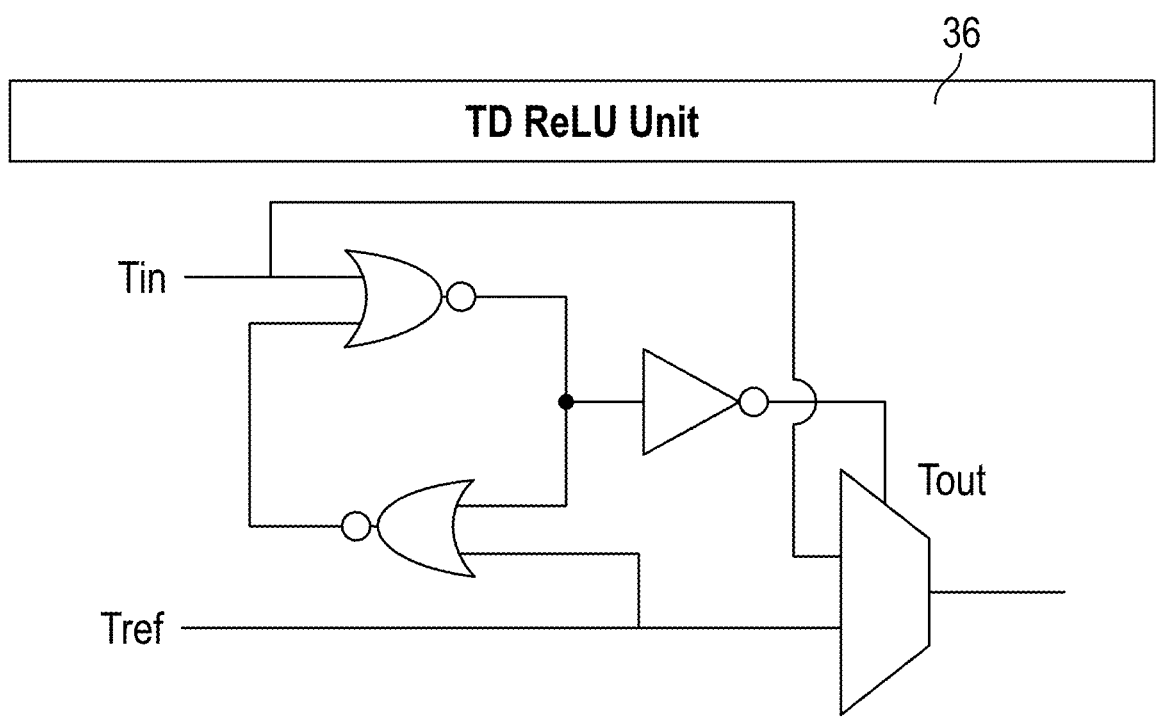
Figure 4A:
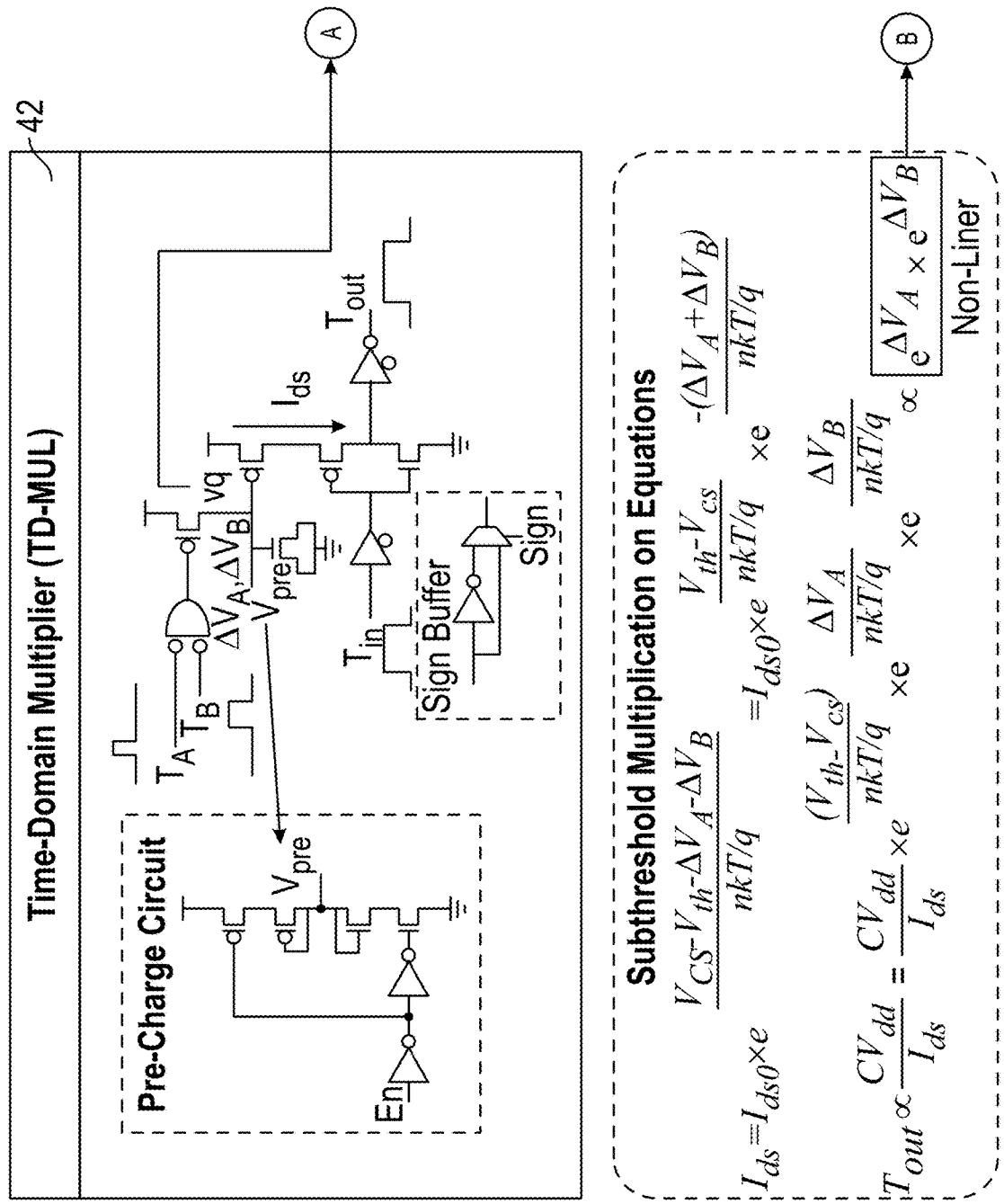
FIGS. 4A-4E illustrate an example TD sub-vth multiplier and linearization implementation.
Figure 4B:
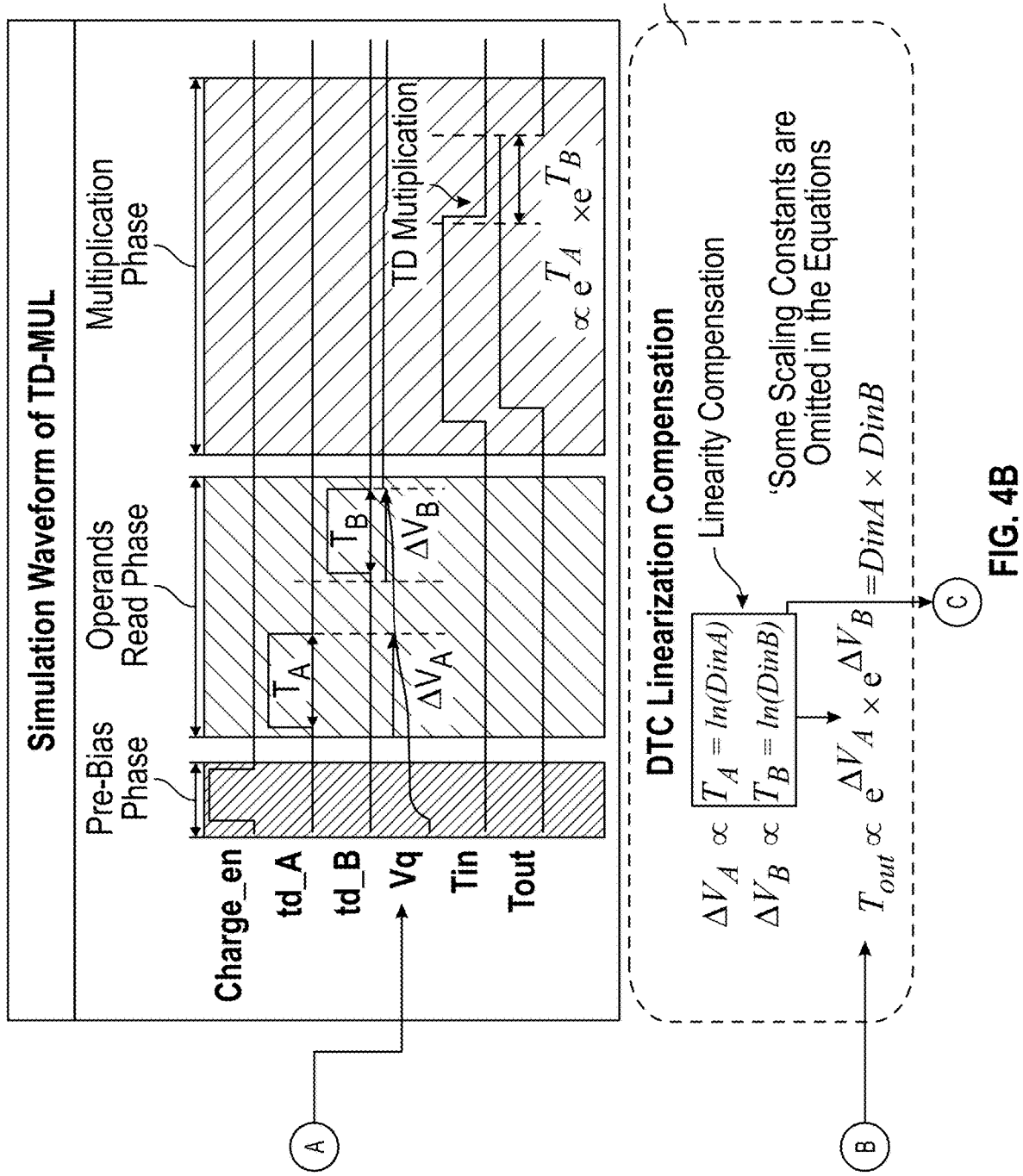
Figure 4C:
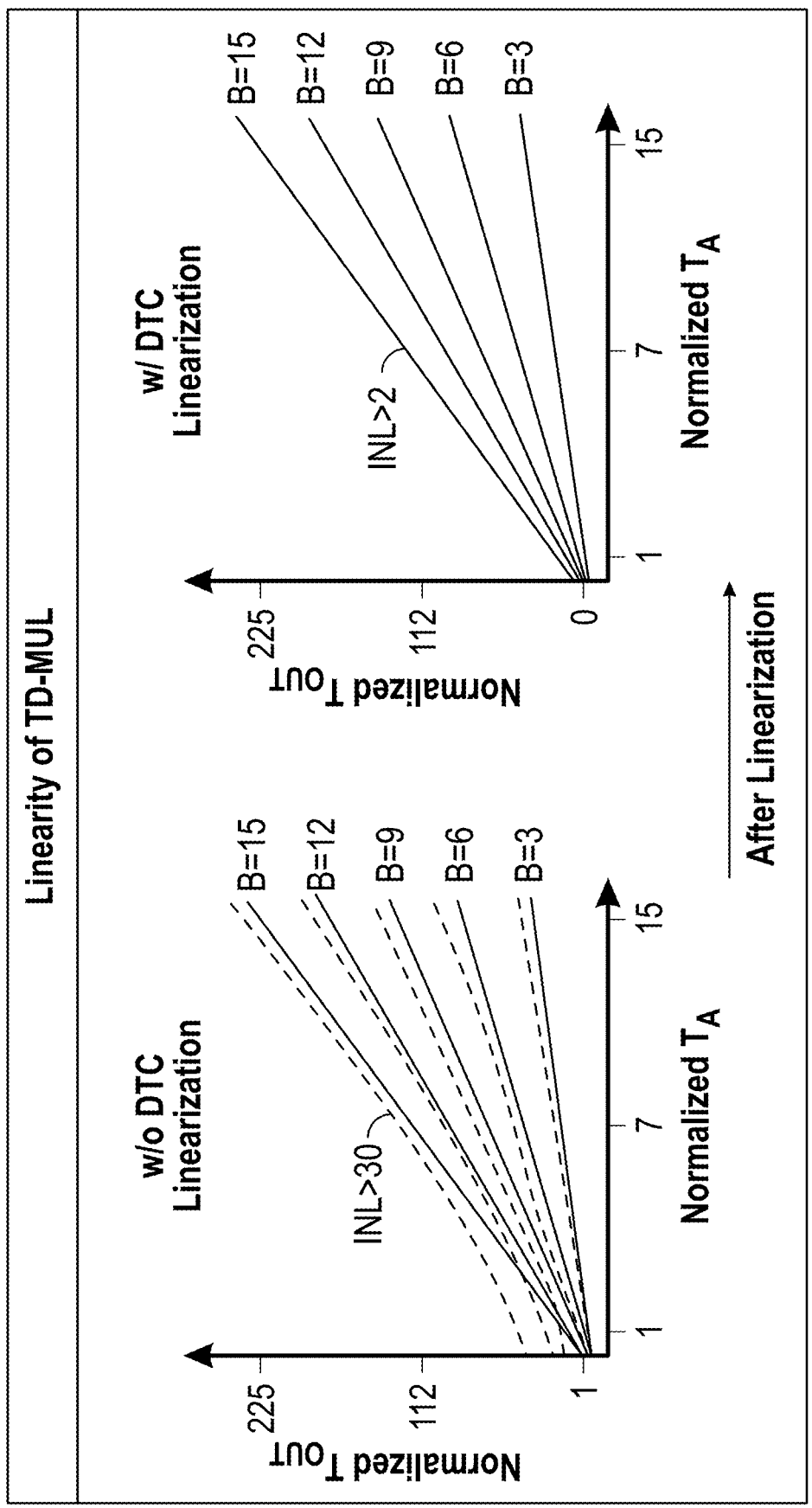
Figure 4D:
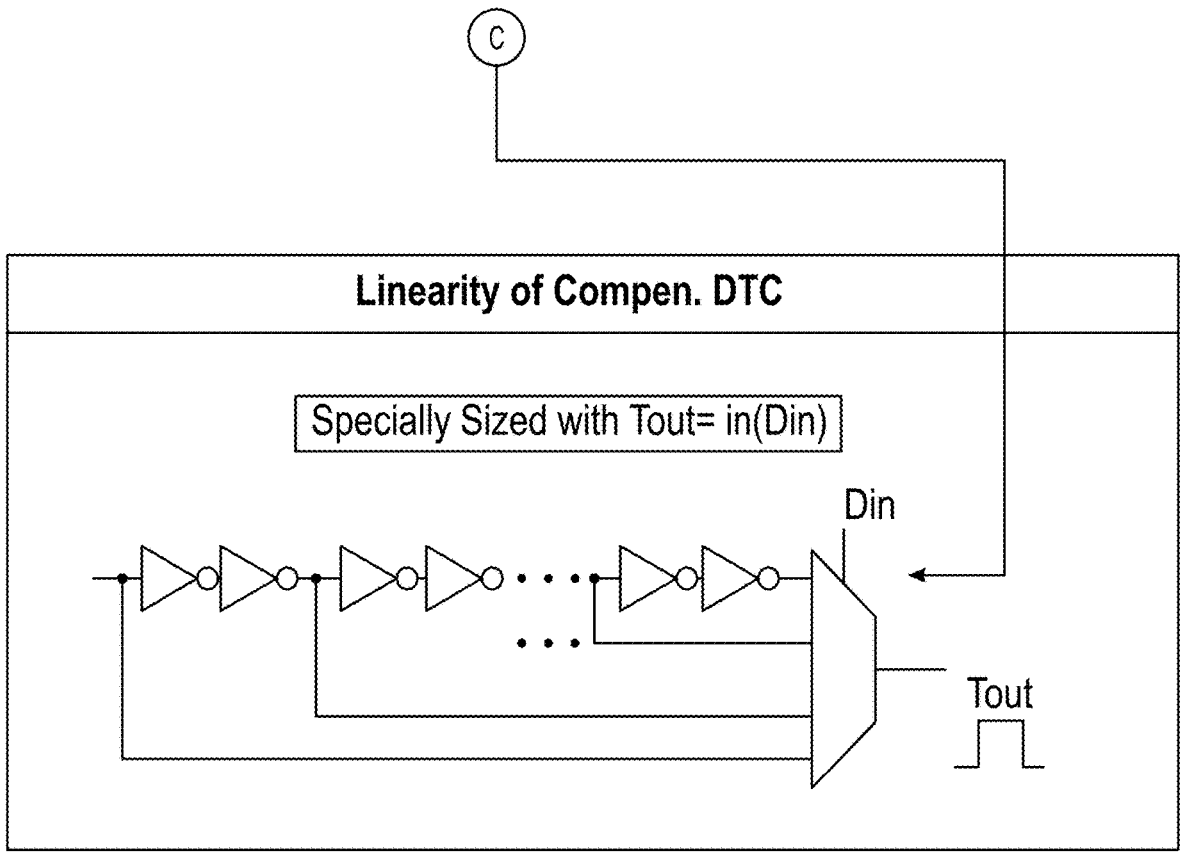
Figure 4E:
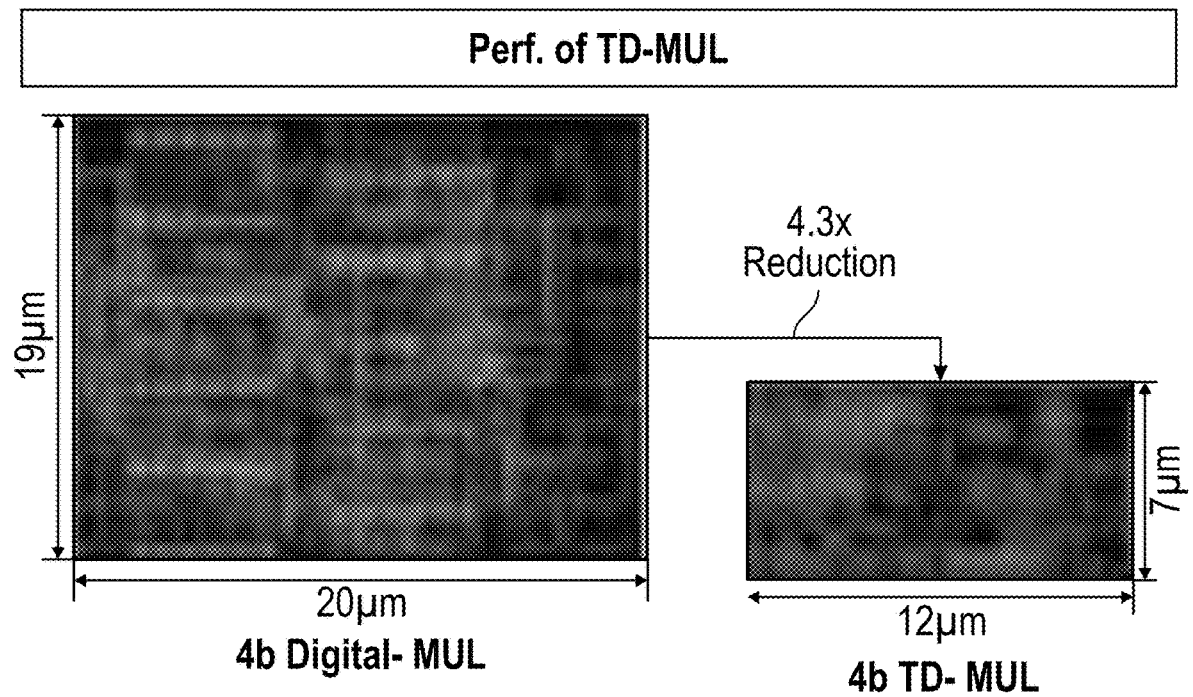
Figure 4E:
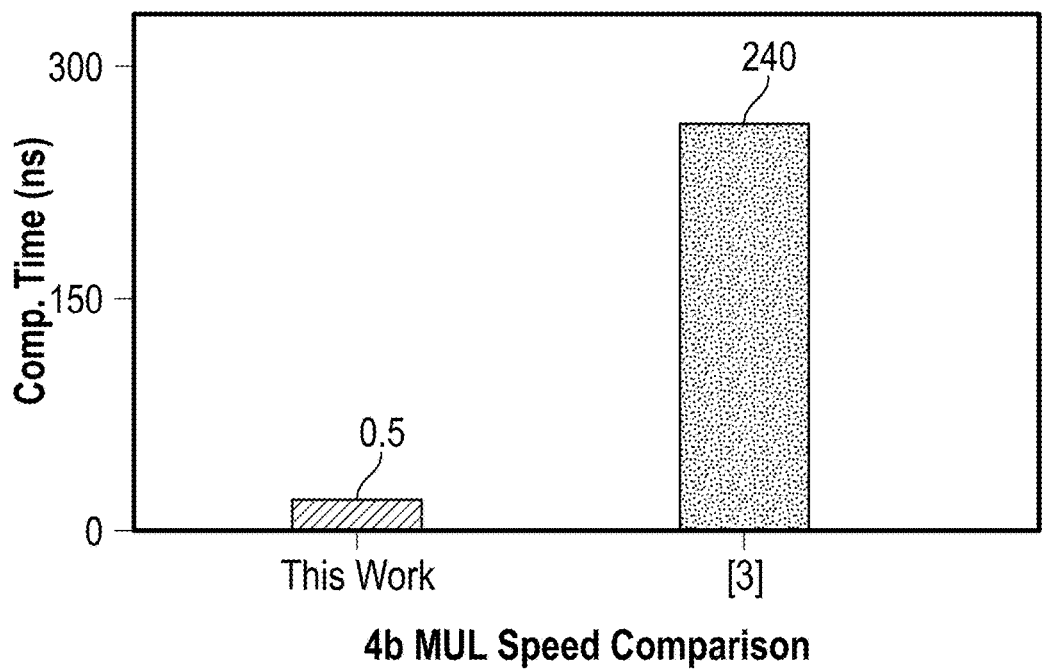
Figure 5A:
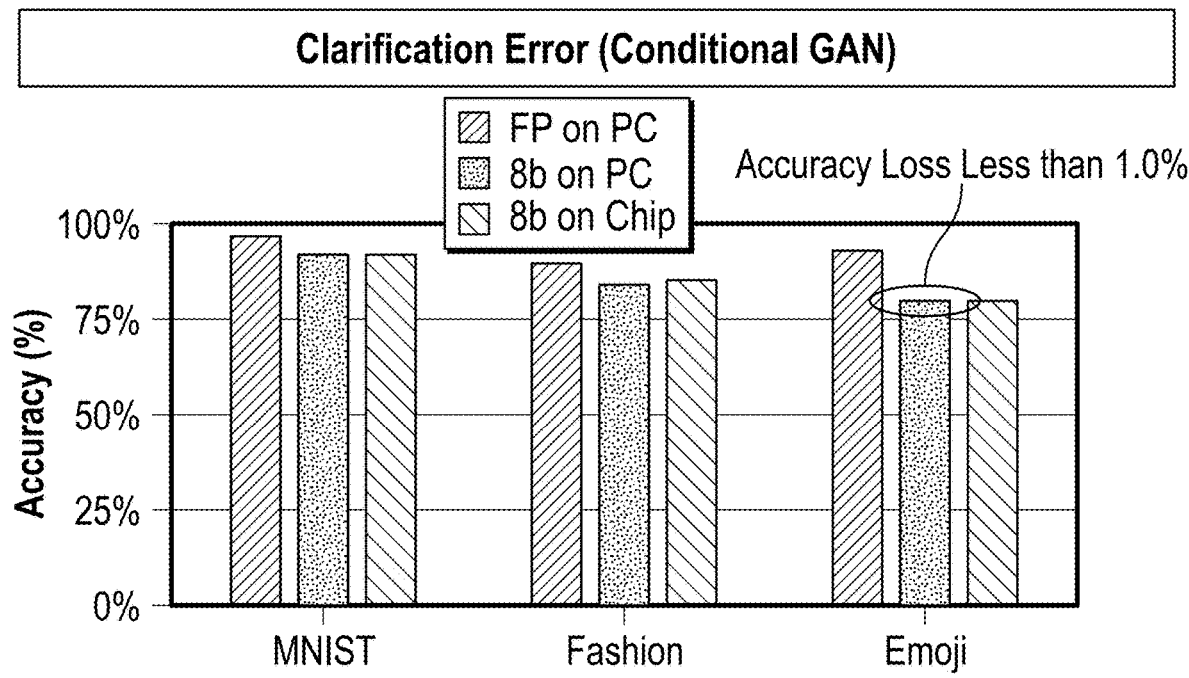
FIGS. 5A-5G illustrate example measurement results.
Figure 5B:
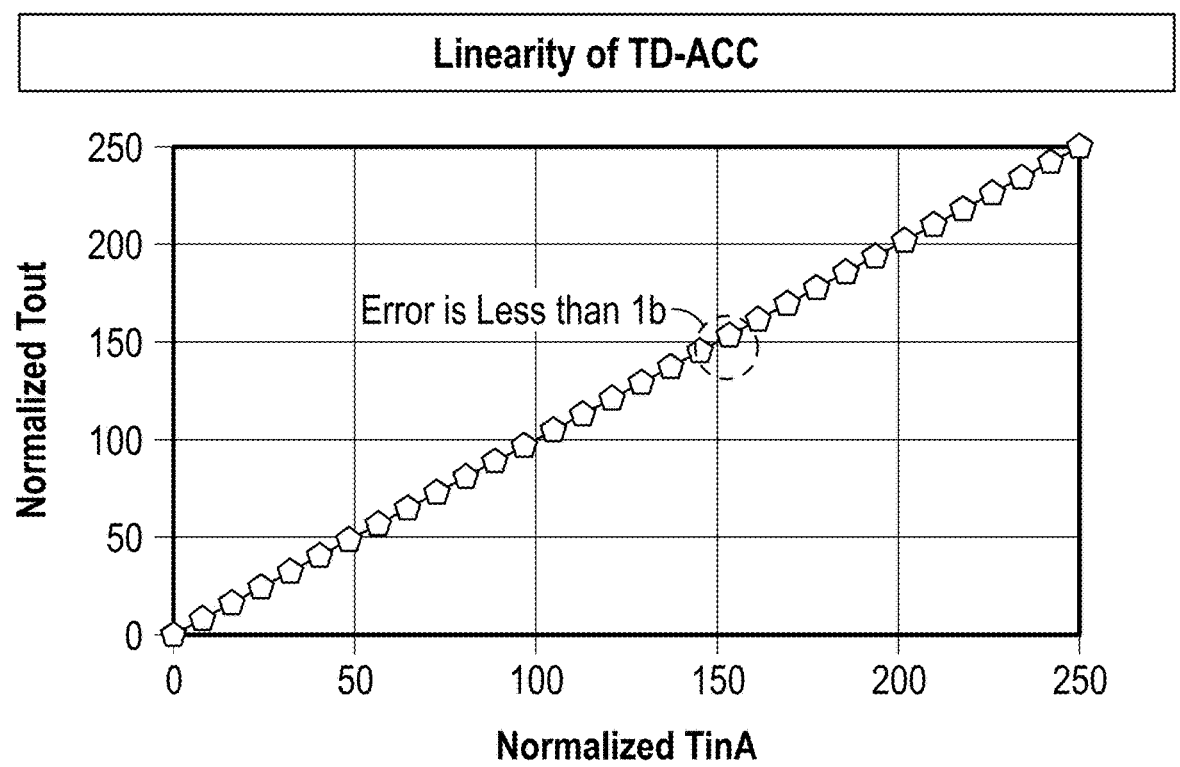
Figures 5C, 5D:
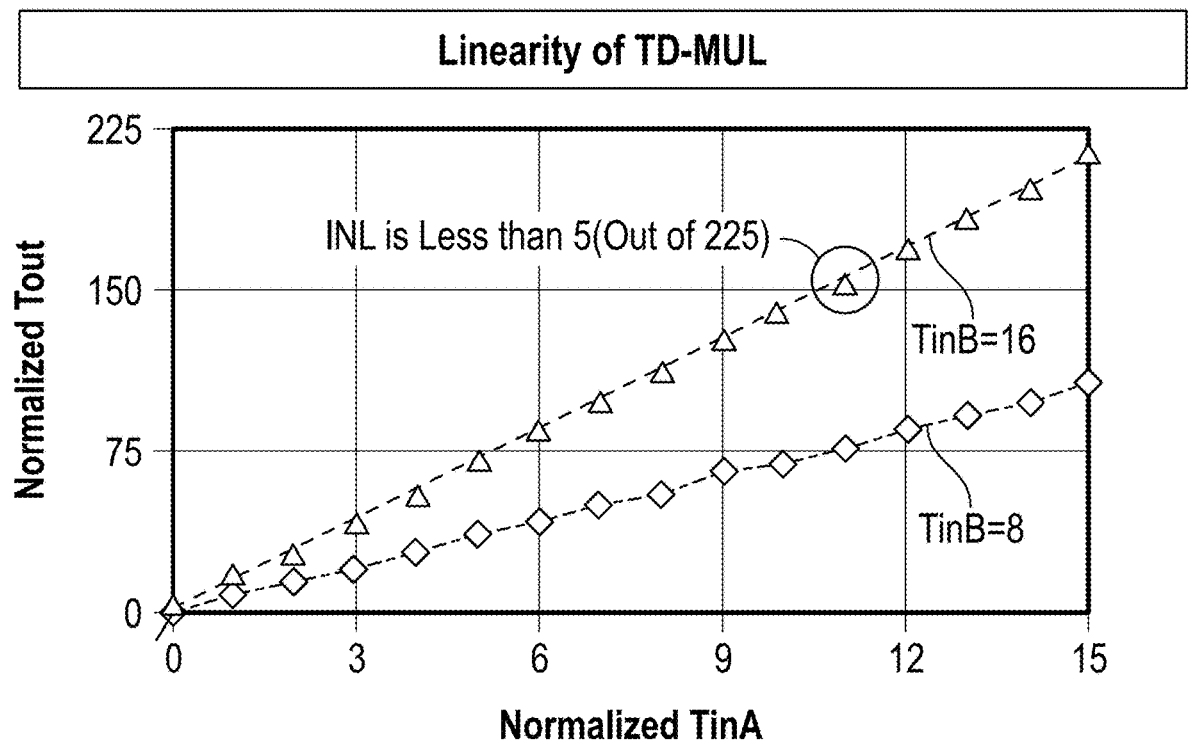
Figure 5E:
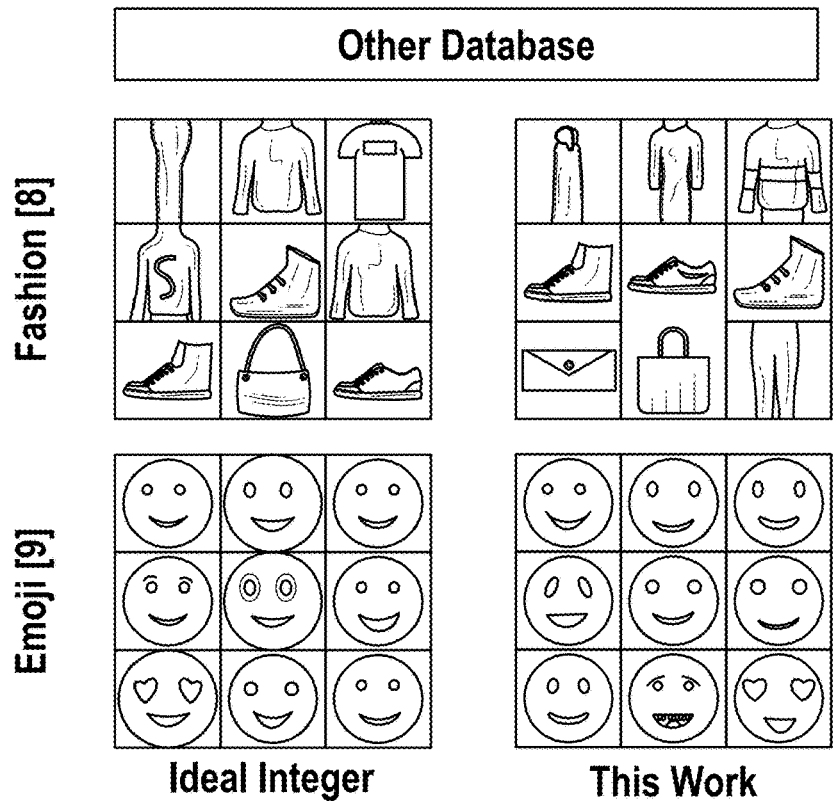
Figure 5F:
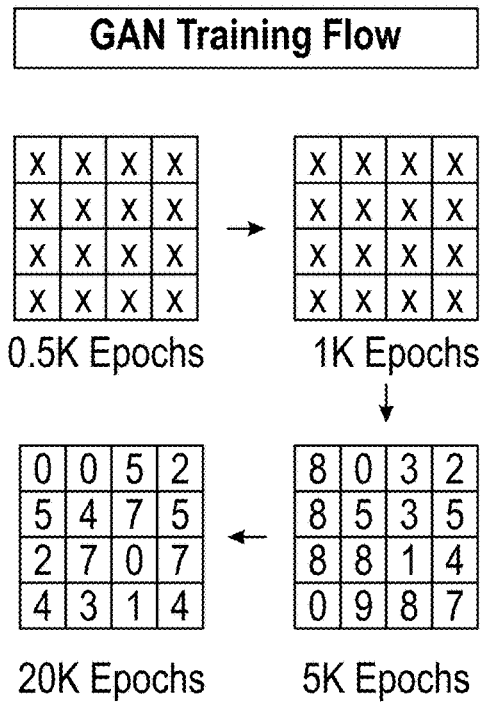
Figure 5G:
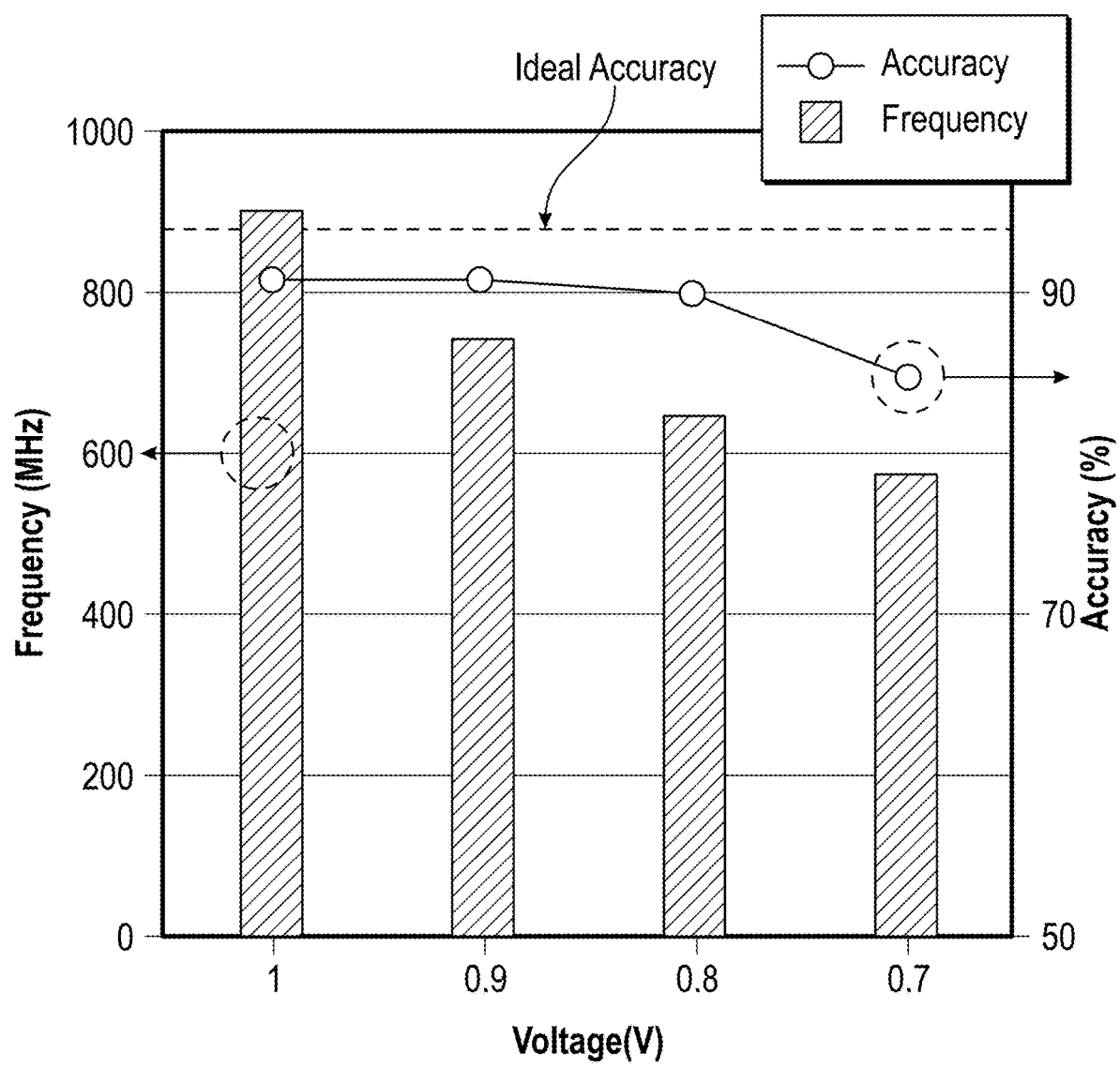
Figure 6A:
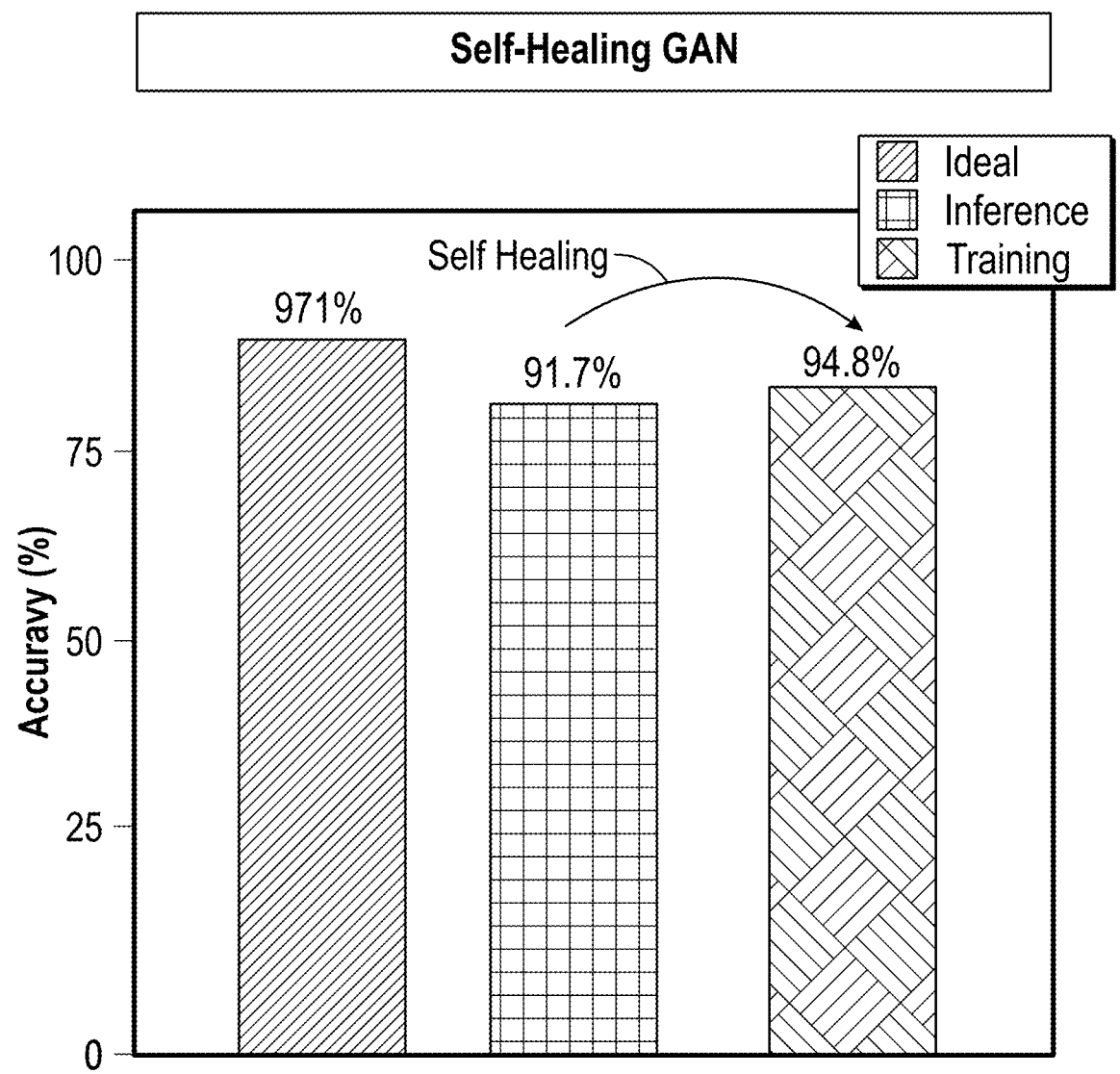
Figure 6B:
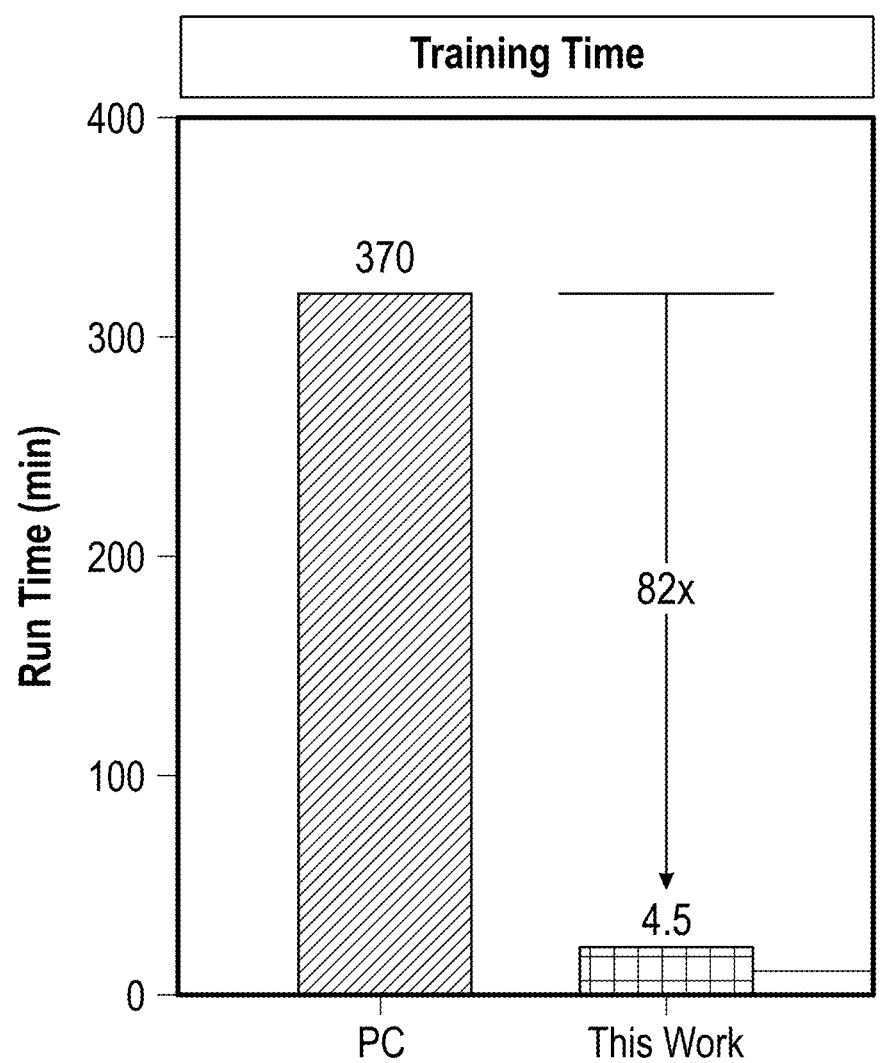
Figure 6C:
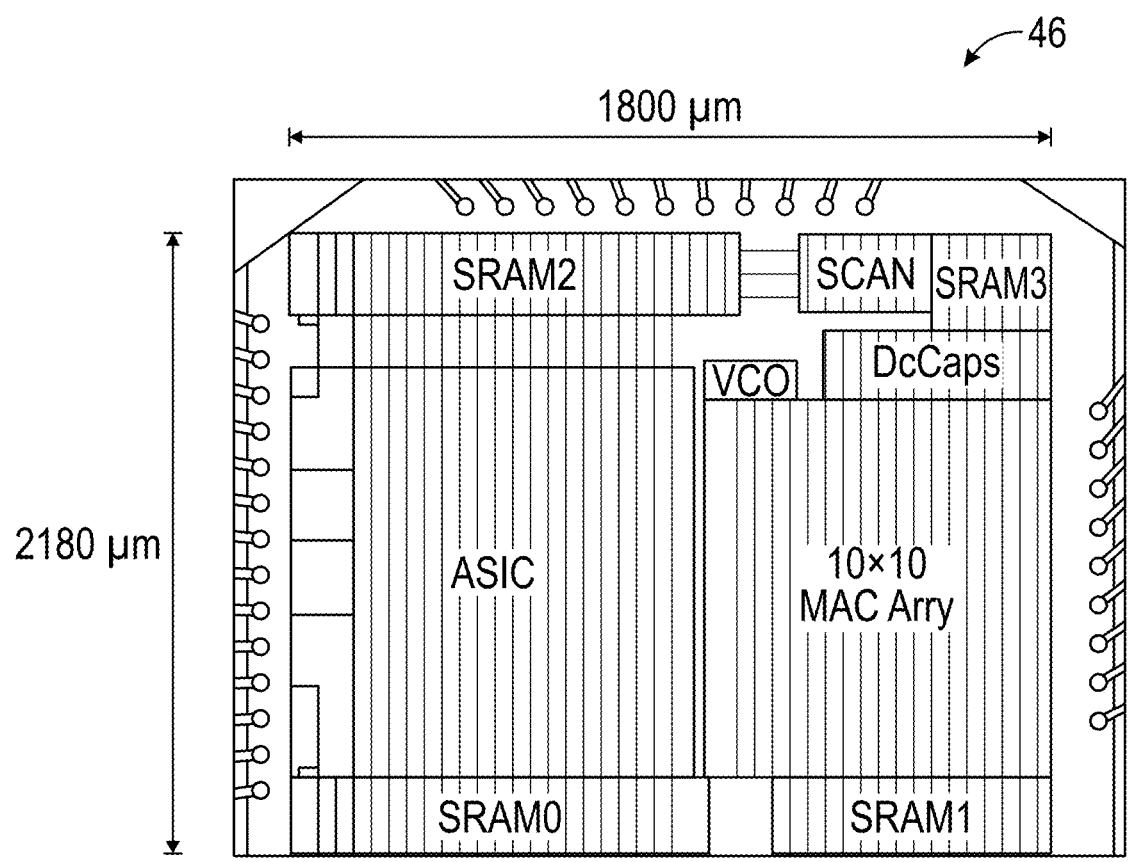

FIG. 2 shows the training sequence 10. Each training iteration consists of 7 unique phases (e.g. forward prop., loss cal.) with 5 phases for the generator 12 and 4 phases for the discriminator 14. Each phase also contains 4 to 6 sub-tasks 15 (e.g. Conv, FC, pooling, etc.). To avoid model collapsing, an adaptive training 16 and model strength control scheme 18 was implemented which ceases the training of discriminator 14 if its strength is too high and adaptively increases the magnitude of the gradients during back propagation. The training sequence 10 is managed by an ASIC training management unit (TMU) 20 as shown in FIG. 2. A total of 41 training stages were implemented in the TMU as a finite state machine. Special operations such as pooling, sigmoid, data transpose etc. were handled by the dedicated hardware modules inside the TMU 20. Register files were used to store temporary weights and feature map outputs, bridging the throughput mismatch between SRAM and MAC arrays.

FIGS. 3A-3F show the test chip architecture diagram 22 including the TMU 20, a 10×10 time-domain (TD) MAC matrix 24, static random-access memory (SRAM) modules 26 and supporting blocks. All the MAC operations of convolutional neural network (CNN) 28 (shown in FIG. 2) and Transpose-CNN (T-CNN) 30 are performed by a TD MAC matrix 24 to improve area and energy efficiency. The time pulses generated from digital-to-time converters (DTC) 32 are processed by the subsequent multiplication-accumulation circuit (MAC) 34 and activation unit 36 all in time domain and are finally converted back into digital domain using time-to-digital converters (TDC) 38. A special 16$b$ time-pulse based time-domain accumulator (TD-ACC) 40 is designed using four 4-b ring-based time accumulators with carry propagation to realize accumulation efficiently. With the special TD-ACC 40, the TDC 38 is only activated once every 25 MAC operations, removing 94% of the time and power overhead from the expensive TDC operations. Pushing all operations in time domain significantly reduces the cross-domain data conversion, rendering a 160× speed-up in MAC operation compared with previous counter-based TD designs. The 8-b TD multiplication is partitioned into four 4-bit multiplications to improve the computation accuracy and speed.

FIGS. 4A-4E show the detailed circuit design featuring a subthreshold (sub-vth) TD multiplier (TD-MUL) 42 and a DTC-based linearization technique 44. The TD-MUL 42 takes input time pulses and generates output pulses of the multiplication results. As in FIGS. 4A-4E, the current starving PMOS transistor is pre-biased at subthreshold region and generates a delay equals to the multiplication results through charge accumulation at the gate with logarithmic addition, i.e. a multiplication is addition in log domain. Compared to the digital implementation, the implemented sub-vth multiplier renders a 4.3× reduction of area. However, as shown in simulation, significant nonlinearity is observed in sub-vth multiplication. The nonlinearity is compensated by a logarithmic encoding of DTC. As shown in both equation and the simulated waveforms in FIGS. 4A-4E, the linearization technique elegantly removes nonlinearity with negligible overhead. After the multiplication, the resulting time pulses are sent into TD-ACC 40 for accumulation of 25 cycles avoiding time-consuming digitalization. Simple TD ReLU function is also implemented at each CNN layer except the final layer which uses digital sigmoid function.

FIGS. 5A-5G show the measured linearity from both the TD-MUL 42 and TD-ACC 40. For the multiplier, although up to 4% error is seen in the result, most of the error is just a small scaling factor shift. Less than 1 b error is observed in the TD-ACC design. We trained the GAN with 3 databases, i.e. a digit-MNIST, a fashion, and an emoji database. The accuracy of the generated images with conditional GAN from 3 databases shows less than 1% error compared to the ideal integer 8-bit training on CPU and 3% compared with ideal floating-point training (1.6% comes from quantization loss and the rest from process variation of TD circuit). The chip is verified with supply voltages down to 0.7V with up to 5% degradation of accuracy compared with ideal GAN operation. Interestingly, a "self-healing" feature of GAN is observed, recovering most of the error loss from on-chip variations compared with no on-chip training. This intrinsic resiliency presents a merit for training empowered design using mixed-signal circuits. The chip consumes 39 mW power with TD-MAC at 90 MHz. The total training time of MNIST database takes 4.5 minutes which is 82× less than a high-performance CPU (2.6 GHz Intel i7 Quad-core with a power of 197 W). The die photo 46 and comparison table 48 with prior analog mixed-signal (AMS) designs are shown in FIGS. 6A-6D. As most of existing AMS designs suffer from low throughput, this work achieves the highest throughput of 18~5400× with similar efficiency. In addition, a low-cost 8-bit on-chip training was realized for AMS design on the very challenging GAN operation.

Other systems, methods, features and advantages will be, or will become, apparent to one with skill in the art upon examination of the figures and detailed description. It is intended that all such additional systems, methods, features and advantages be included within this description, be within the scope of the disclosure, and be protected by the following claims.

What is claimed is:

1. An edge device, comprising:
a memory; and
a mixed-signal generative adversarial network (GAN) accelerator in communication with the memory,
wherein the GAN accelerator is configured to perform mixed-signal time-domain training,
wherein the GAN accelerator comprises an application-specific integrated circuit (ASIC) training management unit (TMU) in communication with the memory, wherein the ASIC TMU is configured to perform a training sequence comprising an adaptive training scheme, and comprises a time-domain multiplication-accumulation (TDMAC) unit in communication with the ASIC TMU,
wherein the TDMAC unit is configured to perform multiplication-accumulation operations of a convolutional neural network and a transpose convolutional neural network.

2. The edge device of claim 1, wherein the GAN accelerator is implemented on an 8-bit low-power application-specific integrated circuit (ASIC) chip.

3. The edge device of claim 2, wherein the 8-bit low-power ASIC chip comprises power consumption of less than 39 mW.

4. The edge device of claim 1, wherein the TDMAC unit comprises a 16-bit time-pulse based time-domain accumulator (TD-ACC) configured to perform the time-domain accumulator operation.

5. The edge device of claim 4, wherein the 16-bit time-pulse based TD-ACC comprises four 4-bit ring-based time accumulators.

6. The edge device of claim 1, wherein the TDMAC unit comprises an 8-bit time-domain multiplier (TD-MUL) configured to perform the time-domain multiplier operations wherein the TD-MUL comprises a subthreshold TD-MUL.

7. The edge device of claim 6, wherein the TD-MUL comprises four 4-bit multipliers.

8. The edge device of claim 1, wherein the ASIC TMU is configured as a finite state machine comprising 41 training stages.

9. The edge device of claim 1, wherein the ASIC TMU comprises modules for performing pooling operations, sigmoid operations, and data transpose operations.

* * * * *